United States Patent [19]

Sekhar

[11] Patent Number: 5,127,969
[45] Date of Patent: Jul. 7, 1992

[54] REINFORCED SOLDER, BRAZING AND WELDING COMPOSITIONS AND METHODS FOR PREPARATION THEREOF

[75] Inventor: Jainagesh A. Sekhar, Cincinnati, Ohio

[73] Assignee: University of Cincinnati, Cincinnati, Ohio

[21] Appl. No.: 497,494

[22] Filed: Mar. 22, 1990

[51] Int. Cl.$^5$ ............................................. B23K 35/34
[52] U.S. Cl. ............................................. 148/23
[58] Field of Search ................................. 148/23–26

[56] References Cited

U.S. PATENT DOCUMENTS

| | | | |
|---|---|---|---|
| 2,700,091 | 1/1955 | Culbertson | 148/24 |
| 3,617,396 | 11/1971 | Duff | 148/23 |
| 4,415,950 | 11/1983 | Weeks et al. | 361/433 |
| 4,474,323 | 10/1984 | Weeks et al. | 228/123 |
| 4,487,638 | 11/1984 | Hoge | 148/24 |
| 4,625,261 | 11/1986 | Weeks et al. | 361/433 |
| 4,699,763 | 10/1987 | Sinharoy et al. | 419/11 |

OTHER PUBLICATIONS

"Soldering & Brazing Products" J. W. Harris Co., Inc. 1989—p. 7.

*Primary Examiner*—Peter D. Rosenberg
*Attorney, Agent, or Firm*—Frost & Jabobs

[57] ABSTRACT

A solder, brazing or welding composition having improved physical properties, comprising a continuous phase ranging from about 40% to about 99% by volume of a solder, brazing or welding metal or alloy, and a disperse phase ranging from about 60% to about 1% by volume and comprising a reinforcing material in particulate or fibrous form, the reinforcing material being graphite, silicon carbide, a metal oxide, an elemental metal, and/or a metal alloy. A process for preparing the composite comprises providing a solder, brazing or welding metal or alloy, melting the metal or alloy, cooling the metal or alloy to a semi-solid state, subjecting the metal or alloy to vigorous shearing while in the semi-state, adding a reinforcing material as defined above to the metal or alloy during at least one of the cooling and shearing steps in an amount ranging from about 60% to about 1% by volume of the total volume, the reinforcing material being and remaining in particulate or fibrous form as a disperse phase, and solidifying the resulting composite. The composite may have a non-dendritic microstructure or may be amorphous.

28 Claims, 3 Drawing Sheets

REINFORCED SOLDER, BRAZING AND WELDING COMPOSITIONS AND METHODS FOR PREPARATION THEREOF

BACKGROUND OF THE INVENTION

1. Field of the Invention

This invention relates to solder, brazing and welding compositions having improved physical properties by reason of incorporation of a reinforcing material in particulate or fibrous form into a conventional solder, brazing or welding alloy.

2. Prior Art

Lead based and tin based low melting point solders are well known in the art. Representative alloys of this type are classified in ASTM Designation B-32-60T, revised 1966. These alloys may contain from about 30% to about 98% lead by weight, up to about 5.5% antimony, and fractional percentages of aluminum, arsenic, bismuth, copper and iron. Tin based solder alloys may contain from about 30% to about 99% tin by weight, up to about 20% lead, up to about 5.5% antimony, up to about 5% copper, and fractional percentages of aluminum, arsenic, bismuth, and iron.

Other solder alloys are known in which antimony may be present in amounts up to 20% by weight, and in which cadmium and/or zinc may be substituted for lead (or tin) in amounts up to 90% by weight.

Brazing alloys are high melting point compositions used to join stainless steels, copper, brass, nickel based alloys, so-called super alloys and the like, and may contain copper, nickel, chromium, silver and zinc in predominant amounts.

A brazing alloy is also available which has a glassy matrix rather than a crystalline matrix. This is commonly referred to as metallic glass, i.e., an amorphous alloy. Metallic glass is made by very rapidly cooling a boron-containing alloy in the form of a thin film or ribbon. This may then be used as a brazing shim. After the brazing operation is conducted, the alloy solidifies in a crystalline form.

Welding alloys are ordinarily provided in the form of electrodes and may contain stainless steel, copper, nickel, cobalt, titanium and/or magnesium. Such electrodes may be produced either by a powder metallurgy operation or by casting an ingot and extruding or swaging the ingot down to the desired size.

U.S. Pat. No. 4,415,950, issued Nov. 15, 1983 to R. D. Weeks, discloses an electrical component in the form of a solid electrolytic capacitor, having a capacitor body of sintered material and impregnated with a solid electrolyte, a tin containing solder alloy coating on the outside of the capacitor body, and a conductive coating layer, in contact with the solder layer, having pure silver and pure copper particles interspersed therein.

U.S. Pat. No. 4,474,323, issued Oct. 2, 1984 to R. D. Weeks, is a division of U.S. Pat. No. 4,415,950 and claims a method of making an electrical component which includes forming a paint containing, by weight, 10 to 40% silver particles, 50 to 10% copper particles, 2 to 12% polymeric binder, 30 to 60% solvent, and 0.01 to 1% wetting agent. This paint is applied over the solder layer to form the conductive coating layer.

U.S. Pat. No. 4,625,261, issued Nov. 25, 1986 to R. D. Weeks et al, discloses an electrical component comprising a tin-containing solder alloy body and a conductive coating layer having silver particles and uncoated copper particles in intimate mixture.

U.S. Pat. No. 4,699,763, issued Oct. 13, 1987 to S. D. Sinharoy et al, discloses an electrical contact material comprising a pressed and sintered powder having about 0.5 to about 10 weight percent graphite fibers, about 0.1 to about 3% powdered wetting agent, and remainder essentially powdered silver. The wetting agent is nickel, iron, cobalt, copper, or gold, or mixtures thereof. The method of production involves making a slurry of the materials in a volatile hydrocarbon solvent, drying the mixture, and repeatedly pressing and sintering.

The electrical contact material of '763 is alleged to exhibit increased resistance to electrical erosion, high strength, and minimal temperature rise due to make-and-break of an electrical circuit. The contact material is brazed to a contact by a silver-copper solder layer having a thickness of 0.003 to 0.004 inch (0.076 to 0.10 mm).

The above-mentioned patents do not relate to modification of solder, brazing or welding alloys, aside from a reference to minimizing "leeching" of silver particles from a paint layer into a tin solder layer. To the best of applicant's knowledge, there have been no disclosures of addition of reinforcing materials to solder and brazing alloys for the purpose of improving the mechanical properties thereof.

A genuine need exists for solder, brazing and welding compositions which exhibit improved creep strength, modulus of elasticity, ultimate tensile strength, wear resistance, freezing range, usable service temperature, thermal conductivity and electrical conductivity, and a lower coefficient of thermal expansion, for all usual applications of solders, brazing and welding compositions.

SUMMARY OF THE INVENTION

It is an object of the invention to provide non-ferrous solder, brazing and welding compositions meeting the above need.

It is a further object of the invention to provide a process for preparing a composite solder, brazing and welding material fulfilling the above need.

According to the invention there is provided a solder, brazing or welding composition having improved creep strength, modulus of elasticity, ultimate tensile strength, wear resistance, freezing range, usable service temperature, thermal conductivity and electrical conductivity, and a lower coefficient of thermal expansion, the composition comprising a continuous phase ranging from about 40% to about 99% by volume and containing at least one, e.g., of lead, tin, antimony, cadmium, zinc, copper, silver, nickel, chromium, aluminum, boron, cobalt, titanium and magnesium; and a disperse phase ranging from about 60% to about 1% by volume and comprising a reinforcing material in particulate or fibrous form, the reinforcing material being at least one of graphite, silicon carbide, aluminum oxide, a metal oxide, an elemental metal, and a metal alloy.

The invention further provides a process for preparing a composite solder, brazing or welding material having improved creep strength, modulus of elasticity, ultimate tensile strength, wear resistance, freezing range, usable service temperature, thermal conductivity and electrical conductivity, and a lower coefficient of thermal expansion, which comprises providing a metal or alloy containing at least one of, e.g., lead, tin, antimony, cadmium, zinc, copper, silver, nickel, chromium, aluminum, boron, cobalt, titanium and magnesium; melting the metal or alloy, cooling said metal or alloy to a semi-solid state; subjecting the metal or alloy to vigorous shearing while in the semi-solid state; adding a reinforcing material to the metal or alloy during at least one of the cooling and shearing steps in an amount ranging from about 1% to about 60% by volume of the total volume, the reinforcing material being and remaining a disperse phase in particulate or fibrous form and comprising at least one of graphite, silicon carbide, a metal oxide, an elemental metal, and a metal alloy; and solidifying the resulting composite material.

In accordance with the invention there is provided a process for producing a welding electrode by powder metallurgy techniques having improved creep strength, modulus of elasticity, ultimate tensile strength, wear resistance, freezing range, usable service temperature, thermal conductivity and electrical conductivity, and a lower coefficient of thermal expansion, which comprises providing a metal or alloy in particulate form comprising at least one of, e.g., copper, zinc, silver, nickel, chromium, aluminum, boron, cobalt, titanium and magnesium; adding a reinforcing material to the metal or alloy in an amount ranging from about 1% to about 60% by volume of the total volume, the reinforcing material being and remaining in particulate or fibrous form and comprising at least one of graphite, silicon carbide, a metal oxide, an elemental metal and a metal alloy; mixing the metal or alloy and the reinforcing material to obtain a uniform admixture; and compressing and sintering the admixture into an electrode of a desired size.

BRIEF DESCRIPTION OF THE DRAWINGS

Reference is made to the accompanying drawings wherein.

DETAILED DESCRIPTION OF THE INVENTION

Figure 1:
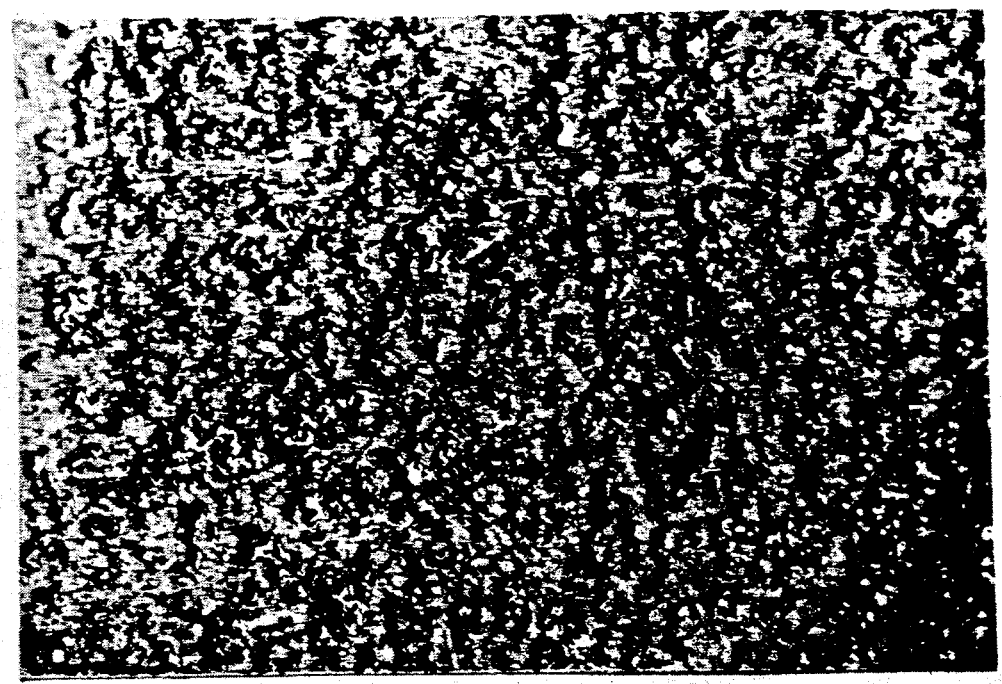
FIG. 1 is a photomicrograph at 50X of a cast microstructure of a lead - 5% tin alloy reinforced with, 15% by volume of copper particles (average particle size of 10 microns) embodying the invention.

In the preferred practice of the invention elemental metals and/or metal alloys in particulate or fibrous form are used as a reinforcing material. Copper, nickel, chromium, silver, niobium, boron, molybdenum, tungsten, aluminum and alloys thereof are suitable exemplary metallic reinforcement materials. It will be understood that these remain in particulate or fibrous form after incorporation into the solder, brazing or welding alloy. When used in particulate form the average particle size preferably ranges from submicron (i.e., less than 1) to about 60 microns. When used in fibrous form, the fibers preferably range from less than 1 to about 60 microns in diameter, and the aspect ratio is at least 2:1.

The term "aspect ratio" is recognized in the art and is used to indicate the long axis/short axis ratio of the particle. Thus, in the case of fibrous particles the aspect ratio indicates length of the fiber/diameter of the fiber.

The fiber length is dependent on the application. The maximum length would be the size of the joining part.

The selection of the type of reinforcing material for a particular base alloy (either solder, brazing or welding) is based on a matching of the following factors:

wettability of the reinforcing material by the molten base alloy;

similarity in densities of the reinforcing material and the base alloy;

higher melting point for the reinforcing material than that of the base alloy.

Wettability may be enhanced by pretreatment of the surfaces of the reinforcing material before mixing it with the base alloy. For metallic reinforcing material the surfaces should be cleaned with zinc chloride, hydrofluoric acid, or with a reducing gas such as hydrogen. For nonmetallic reinforcing material such as graphite and silicon carbide, the surfaces should be cleaned with ethyl alcohol and/or acetone in order to remove oily residues. Thereafter, the surfaces may be etched with hydrofluoric acid, or coated with a metal.

Similarity in densities of the reinforcing material and base alloy is desirable in order to avoid settling or segregation of the disperse phase during mixing and subsequent remelting when joining parts.

The reinforcing material must have a higher melting point than the base alloy in order that the reinforcing material may remain in particulate or fibrous form.

For all types of reinforcing materials the preferred range is from about 5% to about 40% by volume, and the more preferred range is from about 10% to about 25% by volume.

For aluminum based solders, it is preferred to use as reinforcing material graphite, silicon carbide, and/or aluminum oxide. These may be either particulate or fibrous with the average particle size, fiber diameter and aspect ratio being the same as set forth above for metallic reinforcing materials.

The present invention finds utility in all known nonferrous solder, brazing and welding alloys. More specifically, a solder may contain, in weight percent, up to 100% lead, up to 100% tin, up to about 90% cadmium, up to about 40% zinc, up to about 20% antimony, up to about 5% copper, and up to about 80% aluminum. Brazing alloys may contain up to about 40% copper, up to about 95% silver, up to about 40% nickel, and up to about 30% chromium. Welding alloys may contain predominant amounts of copper, nickel, cobalt, and/or titanium, or magnesium up to about 95%. The composition of the solder, brazing or welding alloy is not to be considered an essential limitation in the practice of the present invention.

Another class of chromium - and/or nickel-based brazing alloys contain additions of silicon, phosphorus and/or boron in order to lower the melting point of the alloys. These added elements form silicides, phosphides or borides which precipitate as brittle dendritic structures. In order to avoid the adverse effects of these brittle dendrites on the mechanical properties of a brazed joint, the present practice is to heat the braze part to very high temperatures and to subject it to so-called isothermal solidification brazing techniques which diffuse the silicon, phosphorus or boron into the base metal (i.e., braze part) and thus prevent the formation of deleterious dendritic intermetallic phases. However, if these dendrites are refined or broken up by vigorous shearing in accordance with the process of the present invention, there is no need to resort to the high temperature isothermal solidification techniques since the presence of the non-dendritic refined microstructures of the silicides, phosphides or borides in the braze joint would enhance the mechanical properties in the same manner as reinforcing material.

Moreover, the addition of reinforcing material to this class of chromium - and/or nickel-based brazing alloys will automatically inhibit the formation of large, brittle dendritic structures, possibly by acting as nucleating sites. If the reinforcing material has a similar composition to that of the base alloy which is being joined, the reinforcing material will act as a "getter" of the silicon, phosphorus or boron (the principles of isothermal solidification brazing), and will thus permit larger gaps to be brazed free of deleterious intermetallic phases.

Compositions embodying the invention include, but are not limited to, the following:

A continuous phase containing, in weight percent, up to 100% lead, up to 100% tin, up to about 90% cadmium, up to about 40% zinc, up to about 40% copper, up to about 95% silver, up to about 40% nickel, up to about 80% aluminum, and up to about 95% magnesium; and a disperse phase comprising from about 5% to about 40% by volume of the total volume of at least one of copper, nickel, chromium, silver, niobium, boron, molybdenum, tungsten, aluminum, and alloys thereof, the disperse phase being either in fibrous form with fibers ranging from less than 1 to about 60 microns in average diameter and an average aspect ratio of at least 2:1, or in particulate form with an average particle size ranging from less than 1 to about 60 microns.

A continuous phase comprising a solder alloy containing, in weight percent, up to about 20% tin, up to about 20% antimony, and balance lead and incidental impurities; and a disperse phase comprising from about 5% to about 40% by volume of the total volume of at least one of copper, nickel, chromium, and alloys thereof in fibrous form with fibers ranging from less than 1 to about 60 microns in diameter and an average aspect ratio of at least 2:1.

A continuous phase comprising a solder alloy containing, in weight percent, up to about 30% lead, up to about 20% antimony, up to about 5% copper, and balance tin and incidental impurities; and a disperse phase comprising from about 5% to about 40% by volume of the total volume of at least one of copper, nickel, chromium, and alloys thereof in fibrous form with fibers ranging from less than 1 to about 60 microns in diameter and an average aspect ratio of at least 2:1.

A continuous phase comprising a solder alloy containing predominantly aluminum; and a disperse phase comprising from about 5% to about 40% by volume of the total volume of at least one of graphite, silicon carbide, and aluminum oxide fibers having an average diameter ranging from less than 1 to about 60 microns and an average aspect ratio of at least 2:1.

A continuous phase comprising a brazing alloy containing predominantly copper, nickel and silver; and a disperse phase comprising at least one of copper, nickel, chromium, and alloys thereof in fibrous form with fibers ranging from less than 1 to about 60 microns in diameter and an average aspect ratio of at least 2:1.

A continuous phase comprising a brazing alloy containing predominantly nickel and at least 1.5% by weight boron; and a disperse phase comprising aluminum oxide particles having an average particle size ranging from less than 1 to about 60 microns; the composition being an amorphous metallic glass.

A continuous phase comprising a brazing alloy containing predominantly nickel and chromium with a minor amount of phosphorus; and a disperse phase comprising chromium or alloys thereof in particulate form with an average particle size ranging from less than 1 to about 60 microns.

A continuous phase comprising a welding alloy containing predominantly magnesium; and a disperse phase comprising boron fibers having an average diameter ranging from less than 1 to about 60 microns and an average aspect ratio of at least 2:1.

Conventional low melting point solders have relatively low creep strength, modulus of elasticity and ultimate tensile strength both at room temperature and at moderately elevated temperatures. The present invention overcomes these deficiencies by the provision of composite solder materials and by controlling microstructure evolution during the solidification of the composite solder material.

The method for preparing a composite solder, brazing or welding material in accordance with one embodiment of the invention comprises melting a solder, brazing or welding alloy, cooling to a semi-solid state, subjecting the semi-solid alloy to vigorous shearing, adding a reinforcing material during at least one of the cooling and shearing steps in an amount ranging from about 1% to about 60% by volume of the total volume of the final composite, the reinforcing material being and remaining in particulate or fibrous form, and solidifying the resulting composite material to obtain a microstructure different from that of the base solder or brazing alloy in the cast condition.

It is preferred to add the reinforcing material to the solder, brazing or welding alloy during shearing in the semi-solid state, but it can also be added while the alloy is still liquid. Alternatively, addition can start while the alloy is liquid and continue while in the semi-solid state. Shearing is continued until all the reinforcing material has been added, and preferably for a short time thereafter.

Prior to adding the reinforcing material to the molten or semi-solid alloy, the reinforcing material is preferably pretreated in the manner described above to clean the surfaces thereof.

The term "vigorous shearing" as used herein is intended to define an operation wherein the amount of shear is preferably greater than 1000%. The rate of shear should be greater than 0.5 to 1 mm/mm sec.

Shearing may be effected in any conventional manner and with conventional equipment. Either batch or continuous mixers may be used. Suitable equipment includes the Banbury mixer, double blade mixer with sigma blades or overlapping blades, the Farrel Continuous Mixer (U.S. Pat. No. 3,154,808, issued 1969 to P. Hold et al), a centrifugal impact mixer, a so-called "motionless" mixer (such as the Ross Interfacial Surface Generator), and the like. Addition of the reinforcing material imparts a thixotropic effect. If mixing with a propeller or impeller in batch production, a rotational speed greater than 100 rpm reduces the viscosity of the composite, but it thickens again when mixing is complete.

Conventional ultrasonic agitation may also be used to keep the reinforcing material in a uniform dispersion prior to complete solidification. A suitable ultrasonic processor is sold under the trademark "Vibra-Cell", Models VC 300/VC 600, by Sonics and Materials, Inc.

The morphology which is obtained can be modified by control of the microstructure evolution during solidification. This is effected both by the vigorous shearing to which the semi-solid alloy is subjected and by the reinforcement material which is incorporated therein. For example, it is possible to transform the microstructure from a dendritic to a cellular morphology. Other microstructures can also be attained by variation in the degree of shearing and the amount and nature of the reinforcing material. In some alloys the reinforcing material may act as nucleating sites for one or several matrix phases. The volume fraction of the reinforcement phase will thus influence the grain size of such matrix phase or phases.

It will be understood that when a composite with a desired microstructure is remelted during a soldering or brazing operation, it will resolidify with the same microstructure which it had previously.

It is also within the scope of the invention to add small particles of the matrix solder, brazing or welding alloy during the shearing operation along with the reinforcing material, in which case the composite would be remelted as paste during the soldering operation.

In a further embodiment, applicable to production of metallic glass or amorphous alloys, a boron-containing alloy (generally having at least about 1.5% boron by weight) is subjected to the same processing described above for incorporation of reinforcing material, and after shearing the composite is subjected to very rapid cooling by splatting it on a chilled moving surface to form a thin, amorphous film or strip. This may then be inserted between parts to be joined. After remelting the composite resolidifies with a crystalline microstructure.

In the production of welding electrodes by powder metallurgy the vigorous shearing is replaced by simple mixing of the components to form a uniform admixture, which is then compacted, and heated to a temperature high enough to cause sintering of the welding alloy particles but below the melting point of the reinforcing material. The compressing and heating steps can be repeated if a higher density is desired.

The reinforcing material is normally present in all embodiments as a discrete phase within an interconnected, continuous matrix. However, in some circumstances the reinforcing particles or fibers may be interconnected, and the term "disperse phase" is intended to cover all circumstances.

EXAMPLE 1

A lead-based solder containing 15% antimony, 10% tin and balance lead aside from incidental impurities was melted and composited at 475° C. with vigorous shearing to incorporate 40% by volume graphite fibers having an average diameter of about 30 microns and an aspect ratio of about 4:1. Ultimate tensile strength, modulus of elasticity and density of the reinforced solder composition were compared with those of the lead-based solder with no reinforcing material. The comparison was as follows:

|  | Tensile Strength MPa | Modulus GPa | Density kg/m$^3$ |
|---|---|---|---|
| Present invention | 716.56 | 199 | 7479 |
| Base alloy | 72.35 | 29 | 9695 |

It is evident that the tensile strength was increased by almost 10 times and the modulus of elasticity by almost 7 times. As would be expected, the density was decreased, and a non-dendritic cellular microstructure was obtained in the reinforced composite.

As is well known, conventional solder and brazing alloys have a freezing range rather than a definite melting or freezing point. The compositions of the present invention decrease the freezing range and hence increase the usable service temperature by raising the melting point, thereby obtaining one of the benefits of a eutectic composition (i.e., a narrow freezing range).

This is demonstrated in the following example:

EXAMPLE 2

A lead based alloy containing 5% tin and balance lead aside from incidental impurities was melted and reinforced with 15% by volume of copper particles having an average particle size of 10 microns by incorporating the particles into the base alloy at 437° C. with vigorous shearing. The microstructure of the solidified composite is shown in FIG. 1, from which it is evident that no dendritic structure is present. Comparison of wear resistance and coefficient of thermal expansion of the composite of the present invention with the base alloy was as follows:

|  | Wear weight loss (mg) | Coefficient thermal expansion (m/mK) |
|---|---|---|
| Present invention | 0.012 | 27.2 |
| Base alloy | 0.039 | 30.6 |
| % improvement | 70% | 11% |

It is known in the art that a reduction in the coefficient of thermal expansion leads to reduction in the amount of fatigue resulting from thermally induced stresses.

Figure 2:
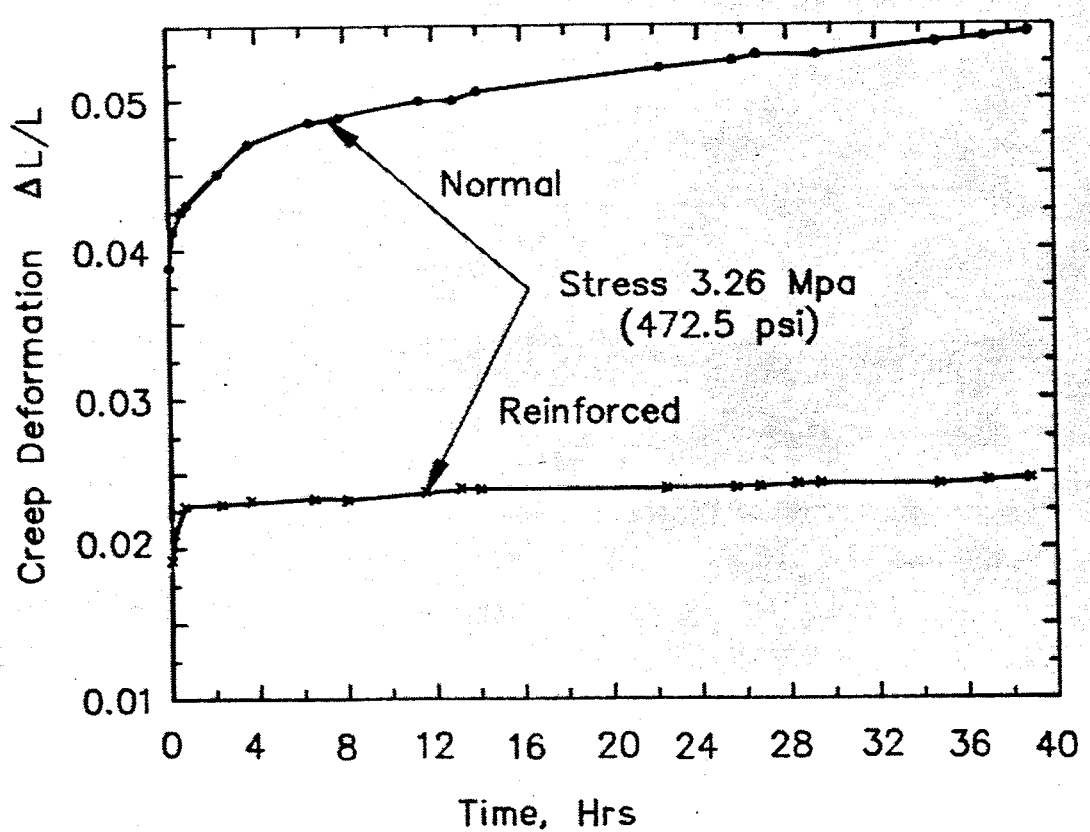
FIG. 2 is a graphic comparison of creep strength of the cast composite of FIG. 1 with the same lead - 5% tin alloy without reinforcing material.

Comparative creep strength curves of the composite and base alloy of Example 2 are shown in FIG. 2. It is significant that the reinforced alloy scarcely increased with time whereas the base alloy showed continuing creep. The improvement in life would thus be expected to be several orders of magnitude.

The semi-solid range was estimated from differential thermal analysis to be 17° C. for the composite and 144° C. for the base alloy without reinforcing material. This would indicate that the composite of the invention could be heated to 300° C. without onset of melting, whereas the base alloy could be taken only to 183° C. without the onset of melting. The usable service temperature, or conversely the usable stress, is thus increased at a given temperature.

EXAMPLE 3

Figure 3:
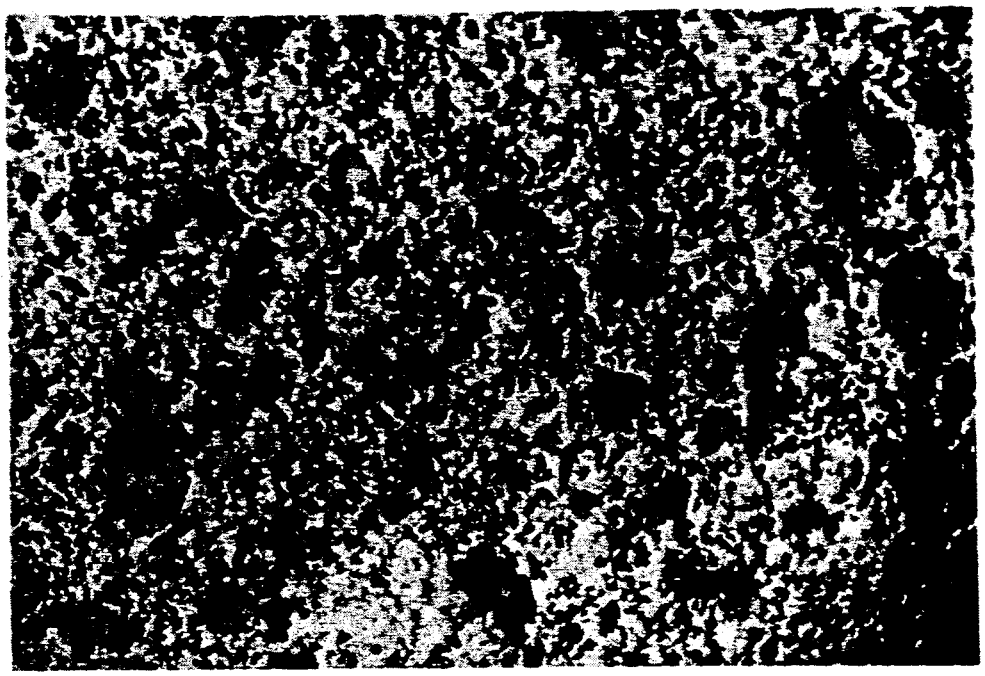
FIG. 3 is a photomicrograph at 50X of a cast microstructure of a tin - 4% copper alloy reinforced with 15% by volume of copper particles (average particle size of 10 microns) embodying the invention.

A tin based solder containing 4% copper and balance tin aside from incidental impurities was melted and reinforced with 15% by volume of copper particles having an average particle size of 10 microns by incorporating the particles into the base alloy with vigorous shearing at 255° C. The microstructure of the solidified composite is shown in FIG. 3. The refinement in microstructure size of the matrix phase is significant and could not be obtained prior to the present invention. Such refinement is known from common knowledge in the art to provide higher ultimate tensile strength and better wear resistance. The hardness of the composite was increased by 10% over that of the base alloy.

EXAMPLE 4

Figure 4:
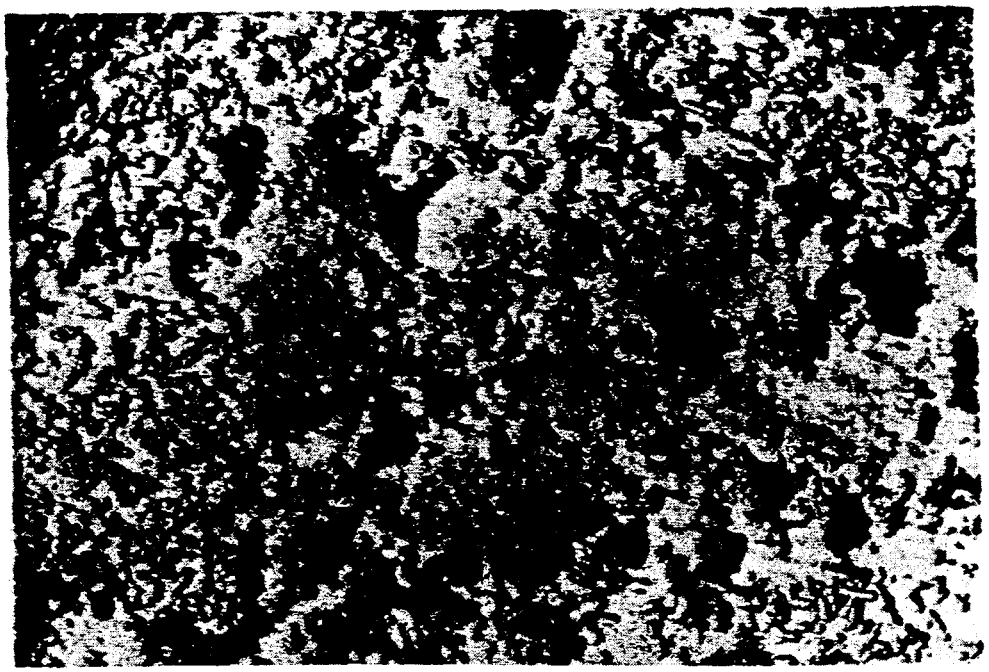
FIG. 4 is a photomicrograph at 50X of a tin - 4% copper alloy reinforced with 15% by volume of nickel particles (average particle size of 3 microns) embodying the invention.

A tin based solder containing 4% copper and balance tin aside from incidental impurities was melted and reinforced with 15% by volume of nickel particles having an average particle size of 3 microns by incorporating the particles into the base alloy with vigorous shearing at 250° C. The composite had a refined microstructure as shown in FIG. 4 and exhibited a hardness increase of 40% over that of the base alloy.

EXAMPLE 5

Figure 6:
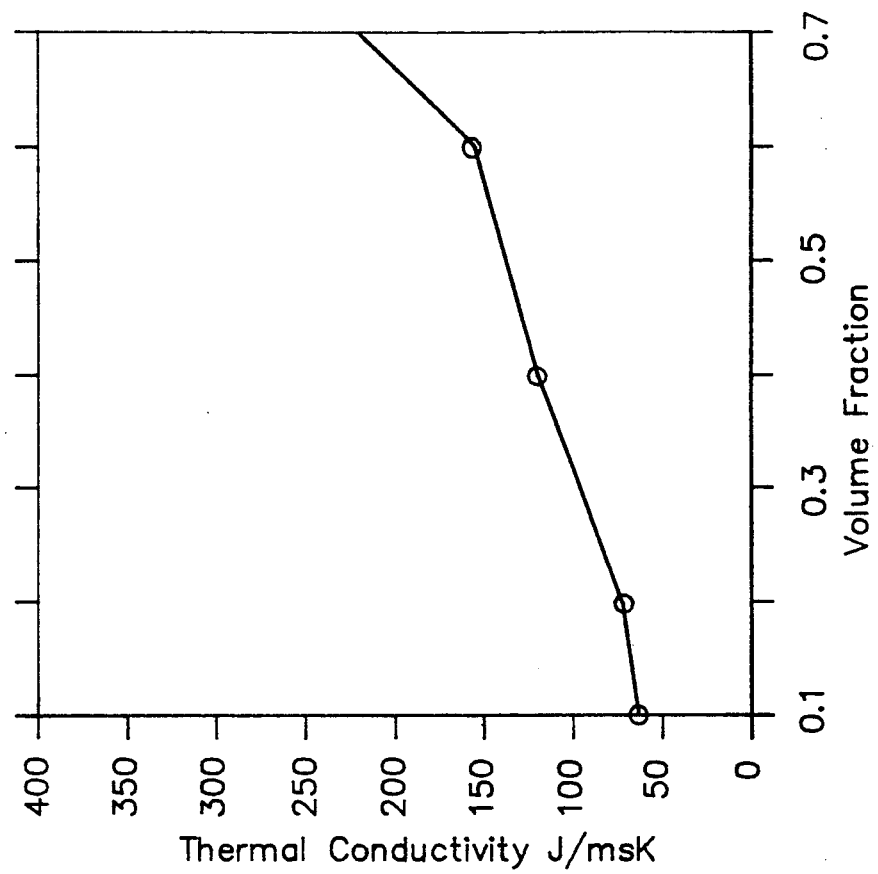
FIG. 6 is a graphic illustration of increase in thermal conductivity with increasing volume fraction of a copper alloy reinforcing material (average particle size of 10 microns) in commercially pure tin.
Figure 5:
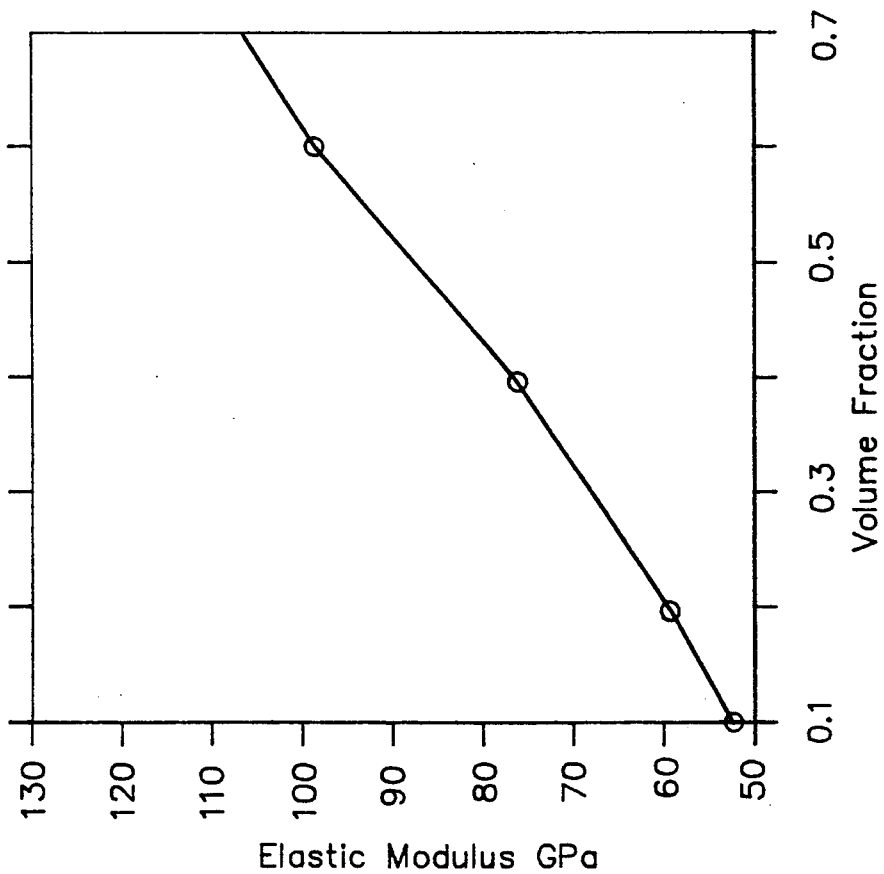
FIG. 5 is a graphic illustration of increase in modulus of elasticity with increasing volume fraction of a copper alloy reinforcing material (average particle, size of 10 microns) in commercially pure tin.

A series of samples of pure lead, except for incidental impurities, were melted and reinforced with successively higher volume fractions of copper alloy particles (from 0.1 to 0.6 volume fractions) having an average particle size of 10 microns by incorporating the particles with vigorous shearing at 327° C. FIG. 5 shows the increase in modulus of elasticity, while FIG. 6 shows the increase in thermal conductivity, in each case with increasing volume fractions of copper alloy reinforcing material.

EXAMPLE 6

A nickel based brazing alloy containing 9% by weight boron was melted and reinforced with 20% by volume of aluminum oxide particles having an average particle size of 3 microns by incorporating the particles into the base alloy with vigorous shearing. The melt was then splatted onto a rotating cylinder having a chilled surface to form a metallic glass. This glass had a 10% increase in hardness in comparison to a glass of the same alloy without aluminum oxide reinforcing material.

EXAMPLE 7

A lead based alloy containing 17% tin and balance lead aside from incidental impurities was melted and reinforced with 25% by volume of chromium fibers having an average diameter of 10 microns and an average aspect ratio of 2:1 by incorporating the fibers with vigorous shearing at 452° C. The Rockwell hardness (H scale) was 12 for the reinforced composite compared to 9.5 for the base alloy.

EXAMPLE 8

A magnesium base welding alloy containing 5.8% by weight aluminum, 0.04% by weight zinc and balance magnesium aside from incidental impurities was reinforced with 25% by volume of boron fibers having an average aspect ratio of 30:1 by incorporating the fibers into the base alloy with vigorous shearing at 592° C. The modulus of elasticity of the reinforced composite was $17.6 \times 10^6$ psi, whereas that of the base alloy was $6.5 \times 10^6$ psi.

EXAMPLE 9

An aluminum based alloy containing 16% by weight silicon was melted and reinforced with about 4.5% by volume of graphite particles having an average particle size of 10 microns by incorporating the particles into the base alloy with vigorous shearing at 550° C. The wear rate of the reinforced composite was determined to be 25% less than that of the base alloy.

EXAMPLE 10

A tin based solder containing 4% by weight copper and balance tin aside from incidental impurities was melted and reinforced with about 25% by volume of copper powder having an average particle size of 0.85 microns and 5% by volume of copper powder having an average particle size of 10 microns by incorporating the particles into the base alloy with vigorous shearing at 255° C. The hardness of the composite was increased by 120% over that of the base alloy. Since hardness correlates directly with ultimate tensile strength, a comparable increase in the ultimate tensile strength can be noted.

Modifications will be evident to those skilled in the art and are considered to be within the scope of the present invention. No limitations are to be inferred except as set forth in the appended claims.

I claim:

1. A solder, brazing or welding composition having improved creep strength, modulus of elasticity, ultimate tensile strength, wear resistance, freezing range, usable service temperature, thermal conductivity and electrical conductivity, said composition comprising a continuous phase ranging from about 40% to about 99% by volume and containing a solder, brazing or welding metal or alloy; and a disperse phase ranging from about 60% to about 1% by volume and comprising a reinforcing material in particulate or fibrous form uniformly mixed throughout said continuous phase, said reinforcing material being at least one of graphite, silicon carbide, a metal oxide, an elemental metal, and a metal alloy.

2. The composition of claim 1, wherein said continuous phase includes at least one of lead, tin, antimony, cadmium, zinc, copper, silver, nickel, chromium, aluminum, boron, cobalt, titanium and magnesium.

3. The composition of claim 2, wherein said continuous phase contains in weight percent, up to 100% lead, up to 100% tin, up to about 90% cadmium, up to about 40% zinc, up to about 40% copper, up to about 95% silver, up to about 40% nickel, up to about 80% aluminum, and up to about 95% magnesium.

4. The composition of claim 3, wherein said disperse phase comprises from about 5% to about 40% by volume of at least one of copper, nickel, chromium, silver, niobium, boron, molybdenum, tungsten, aluminum, and alloys thereof, said disperse phase being in fibrous form with fibers ranging from less than 1 to about 60 microns in average diameter and an average aspect ratio of at least 2:1.

5. The composition of claim 3, wherein said disperse phase comprises from about 5% to about 40% by volume of at least one of copper, nickel, chromium, silver, niobium, boron, molybdenum, tungsten, aluminum, and alloys thereof, said disperse phase being in particulate form with an average particle size ranging from less than 1 to about 60 microns.

6. The composition of claim 1, wherein said continuous phase comprises a solder alloy containing, in weight percent, up to about 20% tin, up to about 20% antimony, and balance lead and incidental impurities.

7. The composition of claim 6, wherein the disperse phase comprises from about 5% to about 40% by volume of at least one of copper, nickel, chromium, and alloys thereof in fibrous form with fibers ranging from less than 1 to about 60 microns in diameter and an average aspect ratio of at least 2:1.

8. The composition of claim 1, wherein said continuous phase comprises a solder alloy containing, in weight percent, up to about 30% lead, up to about 20% antimony, up to about 5% copper, and balance tin and incidental impurities.

9. The composition of claim 8, wherein the disperse phase comprises from about 5% to about 40% by volume of at least one of copper, nickel, chromium, and alloys thereof in fibrous form with fibers ranging from less than 1 to about 60 microns in diameter and an average aspect ratio of at least 2:1.

10. The composition of claim 1, wherein said disperse phase comprises from about 5% to about 40% by volume of at least one of graphite, silicon carbide and aluminum oxide fibers having an average diameter ranging from less than 1 to about 60 microns and an average aspect ratio of at least 2:1.

11. The composition of claim 10, wherein said continuous phase comprises a solder alloy containing predominantly aluminum.

12. The composition of claim 1, wherein said continuous phase comprises a brazing alloy containing predominantly copper, nickel and silver, and wherein said disperse phase comprises from about 5% to about 40% by volume of at least one of copper, nickel, chromium, and alloys thereof in fibrous form with fibers ranging from less than 1 to about 60 microns in diameter and an average aspect ratio of at least 2:1.

13. The composition of claim 1, wherein said continuous phase comprises a brazing alloy containing predominantly nickel and at least 1.5% by weight boron, and wherein said disperse phase comprises from about 5% to about 40% by volume of aluminum oxide particles having an average particle size ranging from less than 1 to about 60 microns, said composition being an amorphous metallic glass.

14. The composition of claim 1, wherein said continuous phase comprises a brazing alloy containing predominantly nickel and chromium with a minor amount of phosphorus, and wherein said disperse phase comprises from about 5% to about 40% by volume of chromium or alloys thereof in particulate form with an average particle size ranging from less than 1 to about 60 microns.

15. The composition of claim 1, wherein said continuous phase comprises a welding alloy containing predominantly magnesium, and wherein said disperse phase comprises from about 5% to about 40% by volume of boron fibers having an average diameter ranging from less than 1 to about 60 microns and an average aspect ratio of at least 2:1.

16. The composition of claim 1, wherein said disperse phase ranges from about 10% to about 25% by volume.

17. A process for preparing a composite solder, brazing or welding material having improved creep strength, modulus of elasticity, ultimate tensile strength, wear resistance, freezing range, usable service temperature, thermal conductivity and electrical conductivity, which comprises providing a solder, brazing or welding metal or alloy, melting said metal or alloy, cooling said metal or alloy to a semi-solid state, subjecting said metal or alloy to vigorous shearing while in said semi-solid state, adding a reinforcing material to said metal or alloy during at least one of said cooling and shearing steps in an amount ranging from about 1% to about 60% by volume of the total volume, said reinforcing material being and remaining in particulate or fibrous form as a disperse phase in uniform admixture throughout said metal or alloy and comprising at least one of graphite, silicon carbide, a metal oxide, an elemental metal, and a metal alloy, and solidifying the resulting composite material.

18. The process of claim 17, wherein said metal or alloy which is melted contains, in weight percent, up to 100% lead, up to 100% tin, up to about 90% cadmium, up to about 40% copper, up to about 95% silver, up to about 40% nickel, up to about 60% aluminum, and up to about 95% magnesium.

19. The process of claim 17, wherein said reinforcing material comprises from about 5% to about 40% by volume of at least one of copper, nickel, chromium, silver, niobium, boron, molybdenum, tungsten, aluminum, and alloys thereof, said reinforcing material being in fibrous form with fibers ranging from less than 1 to about 60 microns in diameter and an aspect ratio of at least 2:1.

20. The process of claim 17, wherein said reinforcing material comprises from about 5% to about 40% by volume of at least one of copper, nickel, chromium, silver, niobium, boron, molybdenum, tungsten, aluminum, and alloys thereof, said reinforcing material being in particulate form with an average particle size ranging from less than 1 to about 60 microns.

21. The process of claim 17, wherein said metal or alloy which is melted is a solder alloy containing, in weight percent, up to about 20% tin, up to about 20% antimony, and balance lead and incidental impurities, and wherein said reinforcing material comprises from about 5% to about 40% by volume of at least one of copper, nickel, chromium, and alloys thereof in fibrous form with fibers ranging from less than 1 to about 60 microns in diameter and an aspect ratio of at least 2:1.

22. The process of claim 17, wherein said metal or alloy which is melted is a solder alloy containing predominantly aluminum, and wherein said reinforcing material comprises from about 5% to about 40% by volume of graphite, silicon carbide or aluminum oxide fibers having a diameter ranging from less than 1 to about 60 microns and an aspect ratio of at least 2:1.

23. The process of claim 17, wherein said metal or alloy which is melted is a brazing alloy containing predominantly copper, nickel and silver, and wherein said reinforcing material comprises from about 5% to about 40% by volume of at least one of copper, nickel, chromium, and alloys thereof in fibrous form with fibers ranging from less than 1 to about 60 microns in diameter and an aspect ratio of at least 2:1.

24. The process of claim 17, wherein said composite material is solidified to obtain a microstructure different from that of said metal or alloy in cast form.

25. The process of claim 17, wherein said alloy contains at least about 1.5% boron by weight, and wherein the step of solidifying said composite material includes rapidly chilling a thin film thereof to form an amorphous metallic glass.

26. The process of claim 17, including the step of adding particles of said metal or alloy during said shearing step along with said reinforcing material.

27. The process of claim 17, including the step of cleaning the surfaces of said reinforcing material before adding it to said metal or alloy.

28. A process for preparing a welding electrode having improved creep strength, modulus of elasticity, ultimate tensile strength, wear resistance, freezing range, usable service temperature, thermal conductivity and electrical conductivity, which comprises providing a particulate welding metal or alloy, mixing with said metal or alloy a reinforcing material in an amount ranging from about 1% to about 60% by volume of the total volume to form a uniform admixture, said reinforcing material being in particulate or fibrous form and comprising at least one of graphite, silicon carbide, a metal oxide, an elemental metal, and a metal alloy, compacting the uniform admixture into the form of an electrode, and heating to a temperature sufficient to cause sintering of said welding metal or alloy particles but below the melting point of said reinforcing material.

* * * * *